United States Patent
Qi et al.

(10) Patent No.: US 9,180,488 B2
(45) Date of Patent: Nov. 10, 2015

(54) FUSER MANUFACTURE AND ARTICLE

(75) Inventors: Yu Qi, Oakville (CA); Nan-Xing Hu, Oakville (CA); David C. Irving, Avon, NY (US); Patrick J. Finn, Webster, NY (US); Gordon Sisler, St. Catharines (CA)

(73) Assignee: Xerox Corporation, Norwalk, CT (US)

( * ) Notice: Subject to any disclaimer, the term of this patent is extended or adjusted under 35 U.S.C. 154(b) by 817 days.

(21) Appl. No.: 12/717,334

(22) Filed: Mar. 4, 2010

(65) Prior Publication Data
US 2011/0217529 A1 Sep. 8, 2011

(51) Int. Cl.
*B32B 7/02* (2006.01)
*B05D 5/12* (2006.01)
*B32B 9/04* (2006.01)

(52) U.S. Cl.
CPC ... *B05D 5/12* (2013.01); *B32B 7/02* (2013.01); *B32B 9/04* (2013.01); *Y10T 428/24975* (2015.01); *Y10T 428/31663* (2015.04)

(58) Field of Classification Search
USPC ......... 428/216, 447; 427/58, 122, 123, 126.1, 427/126.3; 977/750, 752, 734
See application file for complete search history.

(56) References Cited

U.S. PATENT DOCUMENTS

| | | | |
|---|---|---|---|
| 6,336,026 B1 * | 1/2002 | Heeks et al. | 399/302 |
| 6,625,416 B1 * | 9/2003 | Badesha et al. | 399/308 |
| 6,678,495 B1 * | 1/2004 | Badesha et al. | 430/124.33 |
| 2004/0091715 A1 * | 5/2004 | Pickering et al. | 428/421 |
| 2007/0148438 A1 * | 6/2007 | Pickering et al. | 428/327 |
| 2007/0298251 A1 * | 12/2007 | Chen et al. | 428/339 |

* cited by examiner

*Primary Examiner* — Tahseen N Khan
(74) *Attorney, Agent, or Firm* — Hoffman Warnick LLC

(57) ABSTRACT

According to an embodiment a method of making a fuser member is described. The method includes, obtaining a silicone layer disposed on a substrate and coating a primer composition including an aqueous dispersion of a fluorelastomer and a curing agent on the silicone layer. A topcoat composition is coated on the primer composition which includes a fluoroplastic dispersion. The primer composition and the topcoat composition are heated to form the fuser member.

6 Claims, 3 Drawing Sheets

FUSER MANUFACTURE AND ARTICLE

BACKGROUND

1. Field of Use

This disclosure is generally directed to fuser members useful in electrophotographic imaging apparatuses, including digital, image on image, and the like. This disclosure also relates to processes for making and using fuser members.

2. Background

In a typical electrophotographic imaging apparatus, an image of an original to be copied, or the electronic document image, is recorded in the form of an electrostatic latent image upon a photosensitive member and the latent image is subsequently rendered visible by the application of thermoplastic resin particles or composites thereof, which are commonly referred to as toner. The visible toner image is in a loose powdered form and can be easily disturbed or destroyed. The toner image is usually fixed or fused upon a substrate or support member support, which may be a cut sheet or continuous media, such as plain paper.

The use of thermal energy for fixing toner images onto a support member is well known. In order to fuse toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Several approaches to thermal fusing of toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time is provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member take place during normal operations. Toner particles that offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation to the hot offset temperature is a measure of the release property of the fuser member, and accordingly it is desirable to provide a fusing surface, which has a low surface energy to provide the necessary release.

A fuser or image fixing member, which can be a roll or a belt, may be prepared by applying one or more layers to a suitable substrate. Cylindrical fuser and fixer rolls, for example, may be prepared by applying an elastomer or fluoroelastomer to an aluminum cylinder. The coated roll is heated to cure the elastomer. Such processing is disclosed, for example, in U.S. Pat. Nos. 5,501,881; 5,512,409; and 5,729,813; the disclosure of each of which is incorporated by reference herein in their entirety.

Fuser members may be composed of a resilent silicone layer with a fluoropolymer topcoat as the release layer. Fluoropolymers can withstand high temperature (>200° C.) and pressure conditions and exhibit chemical stability and low surface energy, i.e. release properties. For instance, fluoroplastics, such as TEFLON® from E.I. DuPont de Nemours, Inc. have a lower surface energy due to high fluorine content and are widely used for oil-less fusing.

Fluoroplastics, such as PTFE and PFA, can be applied by coating technique onto a fuser member substrate to form a release layer. Since fluoroplastics typically require high baking temperatures (i.e. over 300° C.) to form a continuous film, which is well above the decomposition temperature of silicone rubber (about 250° C.), the processing window for forming a fluoroplastic topcoat over a silicone-containing substrate to achieve uniform coatings without defects is extremely narrow. Cracks and bubbles are the two major defects observed during the fabrication of such fuser members.

SUMMARY

According to an embodiment a method of making a fuser member is described. The method includes, obtaining a silicone layer disposed on a substrate and coating a primer composition including an aqueous dispersion of a fluorelastomer and a curing agent on the silicone layer. A topcoat composition is coated on the primer composition which includes a fluoroplastic dispersion. The primer composition and the topcoat composition are heated to form the fuser member.

According to an embodiment, there is provided a fuser member comprising a substrate. A silicone layer is disposed on the substrate. A primer layer is disposed on the silicone layer and the primer layer includes a crosslinked amino-silane and fluoroelastomer. An outer layer is disposed on the primer layer wherein the outer layer includes a fluoroplastic.

According to an embodiment, there is provided a fuser member comprising a substrate and a silicone layer disposed on the substrate. A dual-primer layer is disposed on the silicone layer. The dual primer layer includes a first primer layer disposed on the silicone layer including a crosslinked product of amino-silane and fluoroelastomer, and a second primer layer disposed on the first primer layer including a conductive filler and a fluoropolymer. An outer layer is disposed on the second primer layer and includes a fluoroplastic.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the drawings have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
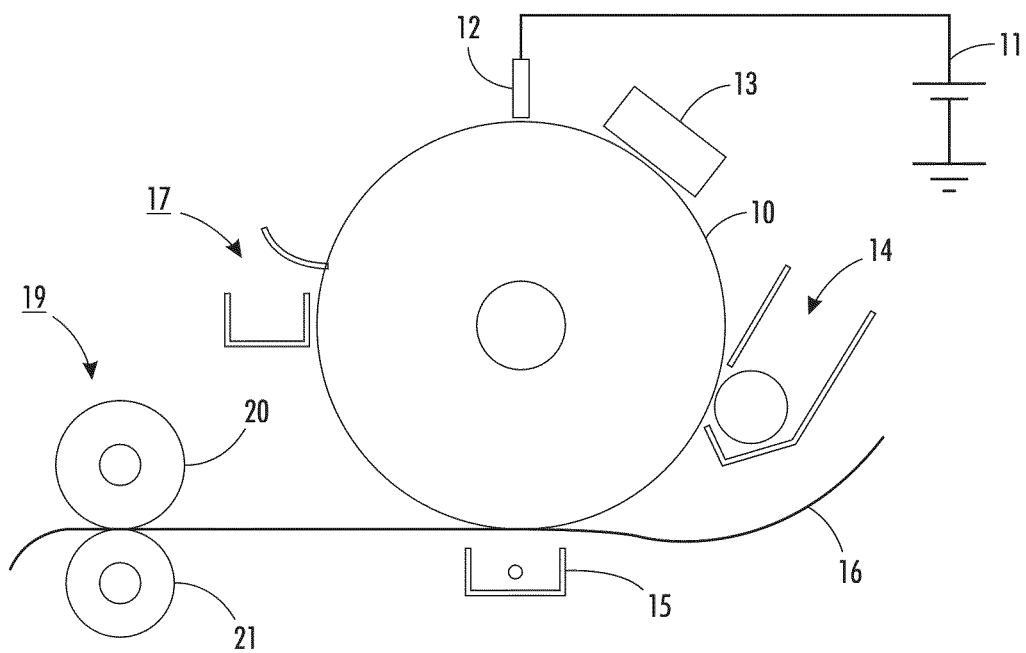
FIG. 1 is a schematic illustration of an image apparatus.

Referring to FIG. 1, in a typical electrophotographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, a photoreceptor 10 is charged on its surface by means of a charger 12 to which a voltage has been supplied from a power supply 11. The photoreceptor 10 is then imagewise exposed to light from an optical system or an image input apparatus 13, such as a laser and light emitting diode, to form an electrostatic latent image thereon. Generally, the electrostatic latent image is developed by bringing a developer mixture from a developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image, forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface in image configuration, they are transferred to a copy sheet 16 by a transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to a fusing station 19, depicted in FIG. 1 as a fuser roll 20 and a pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Subsequent to transfer, photoreceptor 10 advances to cleaning station 17, wherein any toner left on photoreceptor 10 is cleaned therefrom by use of a blade (as shown in FIG. 1), brush, or other cleaning apparatus.

Figure 2:
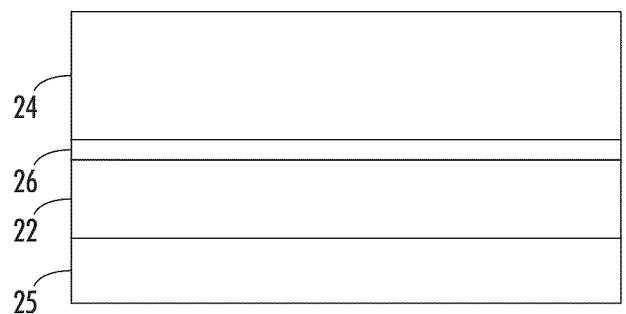
FIG. 2 is a schematic of an embodiment of a fuser member.

FIG. 2 is an enlarged schematic view of an embodiment of a fuser member, demonstrating the various possible layers. As shown in FIG. 2, a substrate 25 has an intermediate layer 22 thereon. Intermediate layer 22 can be, for example, a silicone rubber. On intermediate layer 22 is an outer layer 24, for example, a fluoroplastic. Disposed between the outer layer 24 and the intermediate layer is primer layer 26. The primer layer 26 is prepared by coating a mixture of amino-silane with a fluoroelastomer latex dispersion directly onto the intermediate layer 22. For example, a dispersion of amino-silane and a fluorelastomer is spray coated on silicone roll substrate. Subsequently, the fuser topcoat is prepared by spray-coating the fluoroplastics (e.g. PFA) coating dispersion on top of the primer layer.

The fuser is then heated up to about 200° C. to 250° C. for about 15 minutes to 20 minutes. The fuser is then further heated to a temperature above the melting temperature of the fluoroplastic, ranging from 260° C. to 370° C., to melt the fluoroplastic to form topcoat. The optimal primer thickness ranges from 3 microns to 10 microns and the preferred topcoat thickness is less than 15 microns.

The advantages of the primer layer include an environmentally friendly coating. The primer layer is applied using an aqueous dispersion which can be spray coated to form a uniform layer. No pre-baking of the primer layer is required as with solvent-based coatings. No additional primer is required with the aqueous dispersion described. Strong adhesion to both the silicone layer and topcoat is provided. Finally, improved processing latitude for manufacturing fuser members having fluoroplastic topcoats is achieved with the embodiments described.

Further, embodiments herein provide the ability to control the conductivity of the fuser member. Because fluoroplastics are applied in a solid form, for example by powder coating, it is difficult to add a sufficient amount of conductive particles to the fuser topcoat. Using the primer layer described herein and adding conductive particles thereto, a highly conductive thin primer layer can be formed. As an example, a primer layer can be prepared by spray-coating a mixture comprising conductive particles, for example, carbon nanotubes (CNT), in an aqueous dispersion and a fluoroelastomer latex directly onto silicone roll substrate. Subsequently, the fuser topcoat PFA powder coating can be applied to form the topcoat with desired surface conductivity. The surface resistivity of the primer layer ranges from $10^5 \sim 10^2$ Ω/sq. This highly conductive thin primer layer (2~10 microns) promotes the finished topcoat with desired surface conductivity to meet fuser requirements (<$10^9$ Ω), even though the resistivity of intrinsic topcoat is >$10^9$ Ω.

The primer coating dispersion includes an aqueous dispersion of a fluoroelastomer and a curing agent. The fluoroelastomer is present in the primer coating dispersion in the amount of from about 15 weight percent to about 70 weight percent, or from about 20 weight percent to about 60 weight percent, or from about 25 weight percent to about 50 weight percent of the total dispersion. The curing agent is present in the primer dispersion in the amount of from about 1 weight percent to about 20 weight percent or from about 2 weight percent to about 18 weight percent or form about 3 weight percent to about 15 weight percent of the fluoroelastomer. The water based solvent is present in the primer dispersion in the amount of from about 20 weight percent to about 80 weight percent, or from about 25 weight percent to about 70 weight percent, or from about 30 weight percent to about 60 weight percent of total dispersion. The coating dispersion may further contain conductive fillers dispersed in the water based solvent in the amount of from about 0.1 weight percent to about 10 weight percent, or from about 0.5 weight percent to about 9 weight percent, or from about 1 weight percent to about 5 weight percent of fluoroelastomer. A stabilizer may be further present in the primer dispersion in the amount of from about 0.1 to about 10 weight percent, or from about 0.5 weight percent to about 9 weight percent, or from about 1 weight percent to about 5 weight percent of fluoroelastomer.

The curing agent includes an aminosilane, a phenolsilane, and metal oxides. The typical examples of the aminosilane include (N-(2-aminoethyl)-3-aminopropyltrimethoxysilane), (N-(2-aminoethyl)-3-aminopropyl-methyldiimethoxysilane), (N-(2-aminoethyl)-3-aminopropyl-dimethylmethoxysilane), 3-aminopropyltrimethoxysilane, 3-aminopropyl-methyldimethoxysilane and 3-aminopropyl-dimethylmethylmethoxysilane. Examples of the phenolsilane include the formula of HO—Ar—O-L-SiR$_n$ (OR)$_{3-n}$, wherein Ar represent an aromatic group of from about 6 to about 30 carbon atoms, L is an linkage group selected from a group consisting of methylene, ethylene, propylene, butylenes, pentylene, and hexylene, R represents an alkyl group selected from a group consisting of methyl, ethyl, propyl, butyl, isopropyl, isobutyl and n is an integer of from 0 to 2. The examples of the metal oxides include aluminum oxide, zinc oxide, magnesium oxide, tin oxide and mixtures thereof. The fluoroelastomer is selected from the group consisting of i) copolymers of vinylidenefluoride, hexafluoropropylene and tetrafluoropropylene and tetrafluoroethylene, ii) terpolymers of viylidenefluoride, hexafluoropropylene and tetrafluoroethylene, and iii) tetrapolymers of vinylidene fluoride, hexafluoropropylene, tetrafluoroethylene, perfluoroalkoxy, fluorinated ethylene propylene and tetrafluoroethylene. The water based solvent may further comprise an alcohol, a hydrocarbon containing from about 6 to about 20 carbons, and the mixture thereof. The typical examples of the stabilizer include a polyacrylic acid, a polymethacrylic acid, a polyethylene glycol containing surfactant, and a polyallylamine, a conductive polymer such as poly(3,4-ethylenedioxythiophene) poly(styrenesulfonate) and the like.

Examples of conductive particles or fillers include carbon nanotubes (CNT), carbon blacks such as carbon black, graphite, acetylene black, graphite, grapheme, fluorinated carbon black, and the like, metal, metal oxides and doped metal oxides, such as tin oxide, antimony dioxide, antimony-doped tin oxide, titanium dioxide, indium oxide, zinc oxide, indium oxide, indium-doped tin trioxide, metal carbide and the like, and mixtures thereof; and polyaniline. The conductive particles may be present in the primer layer in an amount of from about 0.1 weight percent to about 30 weight percent and or from about 0.5 weight percent to about 20 weight percent, or from about 1 weight percent to about 10 weight percent of total solids of the primer layer.

As used herein and unless otherwise specified, the term "carbon nanotube" or CNT, refers to an elongated carbon material that has at least one minor dimension; for example, width or diameter of up to 100 nanometers. In various embodiments, the CNT can have an average diameter ranging from about 1 nm to about 100 nm, or in some cases, from about 10 nm to about 50 nm, or from about 10 nm to about 30 nm. The carbon nanotubes have an aspect ratio of at least 10, or from about 10 to about 1000, or from about 10 to about 100. The aspect ratio is defined as the length to diameter ratio.

In various embodiments, the carbon nanotubes can include, but are not limited to, carbon nanoshafts, carbon nanopillars, carbon nanowires, carbon nanorods, and carbon nanoneedles and their various functionalized and derivatized fibril forms, which include carbon nanofibers with exemplary forms of thread, yarn, fabrics, etc. In one embodiment, the CNTs can be considered as one atom thick layers of graphite, called graphene sheets, rolled up into nanometer-sized cylinders, tubes, or other shapes.

In various embodiments, the carbon nanotubes or CNTs can include modified carbon nanotubes from all possible carbon nanotubes described above and their combinations. The modification of the carbon nanotubes can include a physical and/or a chemical modification.

In various embodiments, the carbon nanotubes or CNTs can include single wall carbon nanotubes (SWCNTs), multi-wall carbon nanotubes (MWCNTs), and their various functionalized and derivatized fibril forms such as carbon nanofibers.

The CNTs can be formed of conductive or semi-conductive materials. In some embodiments, the CNTs can be obtained in low and/or high purity dried paper forms or can be purchased in various solutions. In other embodiments, the CNTs can be available in the as-processed unpurified condition, where a purification process can be subsequently carried out.

The carbon nanotubes are present in an amount of from about 0.1 to about 30 or from about 0.5 to about 10, or from about 1 to about 5 weight percent based on the total weight of the carbon nanotube and the primer layer.

Figure 3:
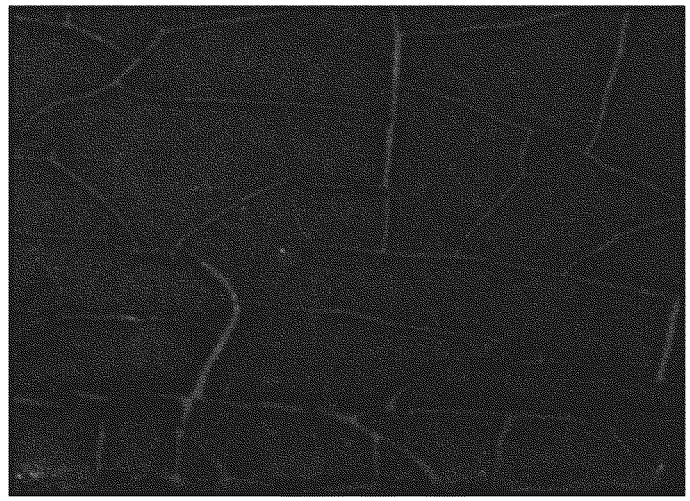
FIG. 3 is a photograph of a fluoroplastic topcoat containing cracks.
Figure 4:
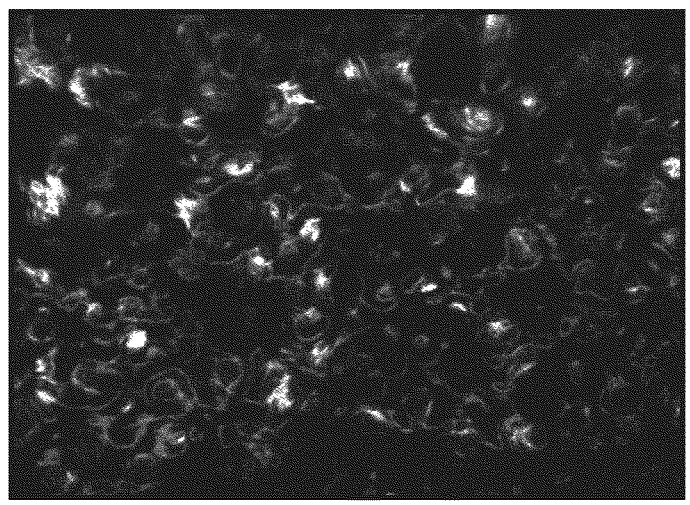
FIG. 4 is a photograph of a fluoroplastic topcoat containing bubbles.

Fluoroplastics have been used as the topcoat materials for oil-less fusing for their good releasing property. PFA and PTFE, the most representative fluoroplastics for fusing applications, are chemically and thermally stable and possess a low surface energy. However, these materials are also highly crystalline and therefore difficult to process. High temperature sintering (>350° C.) is the only way to make them into a continuous film. The silicone rubber layer starts to degrade around 250° C. It is theorized that while melting the topcoats at temperatures greater than 300° C., the silicone rubber releases gas or small molecules. This creates cracks or bubbles in the topcoat layer as shown in FIG. 3 (cracks) and FIG. 4 (bubbles). The cracks and bubbles formed in the fluoroplastic surface layer coatings are caused by the silicone rubber degradation while baking the fluoroplastic surface layer at high temperatures. The required baking temperature for PFA is over 320° C., which is well above the decomposition temperature of silicone rubber (about 250° C.). When the decomposed materials release during the formation of the fluoroplastic surface layer, cracks or bubbles are formed. The current fluoroplastic coating formulations provide an extremely narrow processing window to achieve a defect-free fluoroplastic topcoat. The manufacturing yield of the fluoroplastic fuser topcoats is very low.

An exemplary embodiment of a topcoat formulation includes fluoropolymer particles. Fluoropolymer particles suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymer particles provide chemical and thermal stability and have a low surface energy. The fluoropolymer particles have a melting temperature of from about 255° C. to about 360° C. or from about 280° C. to about 330° C.

The thickness of the outer fluoroplastic surface layer of the fuser member herein is from about 10 microns to about 250 microns, or from about 15 microns to about 100 microns.

The intermediate layer can include silicone rubbers such as room temperature vulcanization (RTV) silicone rubbers, high temperature vulcanization (HTV) silicone rubbers, low temperature vulcanization (LTV) silicone rubbers and liquid silicone rubbers (LSR). These rubbers are known and readily available commercially, such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182.

The Young's Modulus of the outer layer is from about 50 kpsi to about 100 kpsi, or from about 70 kpsi to about 95 kpsi, or from about 85 kpsi to about 95 kpsi. The tensile stress in the outer layer is from about 1000 psi to about 5000 psi, or from about 2000 psi to about 4000 psi, or from about 2700 psi to about 3300 psi.

In various embodiments, the coating composition can be coated using, for example, coating techniques, extrusion techniques and/or molding techniques. As used herein, the term "coating technique" refers to a technique or a process for applying, forming, or depositing a dispersion to a material or a surface. Therefore, the term "coating" or "coating technique" is not particularly limited in the present teachings, and dip coating, painting, brush coating, roller coating, pad application, spray coating, spin coating, casting, or flow coating can be employed.

Specifically, the primer layer can be coated by spray-coating technique. Typically, the silicone-molded metal roll is heated before coating to about 40 to 80° C., and then mounted on the holder, which then is rotated in vertical direction. The primer dispersion is then sprayed onto the silicone roll. Consequently, the fluoropolymer such as PFA is coated either by spraying the liquid dispersion or by powder coating the fluoropolymer resin powder to form the topcoat. The coated fuser part is then baked at about 250° C. for from about 30 minutes and cooled to room temperature, and then baked in an oven at 355° C. for 15 minutes.

EXAMPLES

Example 1

General Procedure For Preparation of Amino-Silane Crosslinked Fluoroelastomer Primer Layer For Fluoroplastic Fuser Topcoats Preparation of primer coating: AO700 (an aminosilane, 0.35 grams) was mixed with 10 grams of a fluoroelastomer latex (TN latex obtained from Solvay Solexis) and 10 grams of de-ionized water to form the primer coating dispersion.

CNT aqueous dispersion: A surfactant solution was prepared by dissolving about 1.14 grams of polyacrylic acid in about 38.4 grams of deionized water. About 0.4 grams of CNT is then added into the surfactant solution, and the solution is then sonicated with a high power sonicator for about 3 minutes at 60% output. The sonication was repeated 10 times. The resulting 1 wt % CNT aqueous dispersion is stable and uniform.

CNT/PFA coating formulation: About 17.5 grams of CNT dispersion described in above is further mixed with a PFA dispersion having a weight of about 22.5 grams, thereby resulting in about 2% of CNT in PFA. The CNT/PFA dispersion is stable at room temperature. Prior to coating, the CNT/PFA dispersion was sonicated for about 1 minute.

Figure 5:
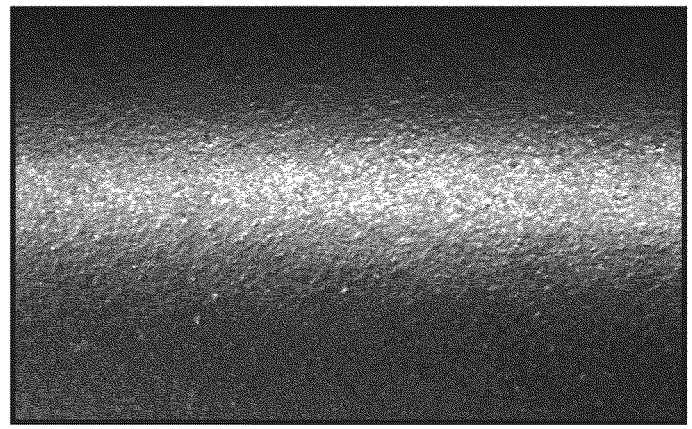
FIG. 5 is a photograph of a fuser member showing a smooth outer surface.

Preparation of a fuser roll: A metal roll having molded silicone was pre-heated at 120° C. for 20 minutes. The primer dispersion was spray-coated on the roll while rotating. The primed roll was heated at 120° C. for 20 minutes and the topcoat dispersion of CNT/PFA dispersion was applied by spray coating. The coated rolls were first heated in an oven at 250° C. for 20 minutes and cooled to room temperature, and then baked in an oven at 355° C. for 15 minutes. FIG. 5 is a photograph of the resulting fuser member and no defects (cracks or bubbles) are present.

Comparative Example

Figure 6:
FIG. 6 is a photograph of a fuser member showing cracks.

A fuser roll was prepared as described in the example above, except the primer coating was a clear primer (990CL purchased from Dupont). FIG. 6 is a photograph of the resulting fuser member, which shows surface defects, e.g., cracks.

Example 2

Preparation of CNT Primed Conductive Fuser Rolls

CNT aqueous dispersion: A surfactant solution was prepared by dissolving about 1.14 grams of polyacrylic acid in about 38.4 grams of deionized water. About 0.4 grams of CNT are added into the surfactant solution, and the solution is then sonicated with a high power sonicator for about 3 minutes at 60% output. The sonication is repeated 10 times with 10 minute intervals in between. The resulting 1 wt % CNT aqueous dispersion is stable and uniform.

Preparation of a fuser roll: A metal roll having molded silicone was pre-heated at 120° C. for 20 minutes, followed by spraying a coating of a mixture of AO700 (an aminosilane, 0.35 grams), 10 grams of a fluoroelastomer latex (TN latex obtained from Solvay Solexis), and 10 grams of de-ionized water to form the first primer layer. The CNT aqueous dispersion (5 grams) and 3.5 grams of a fluoroelastomer latex (TN latex obtained from Solvay Solexis) was spray coated on the aminosilane-fluoroelastomer primer to form the second primer layer. The fuser roll was powder coated with PFA (MP610 from DuPont). The coated roll was cured in an IR oven at 343° C. for 10 minutes, producing a good surface quality fuser roll with a surface resistivity about $10^6 \Omega$.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A fuser member comprising:
   a substrate;
   a silicone layer disposed on the substrate;
   a primer layer disposed on the silicone layer, the primer layer comprising a crosslinked amino-silane and fluoroelastomer, and conductive fillers wherein the primer layer has a thickness of from about 1 μm to about 10 μm, and wherein the primer layer has a surface resistivity of less than $10^5$ ohms/square; and
   an outer layer disposed on the primer layer wherein the outer layer comprises a fluoroplastic.

2. The fuser member of claim 1 wherein the outer layer has a thickness of from about 20 μm to about 100 μm.

3. The fuser member of claim 1 wherein the conductive fillers are selected from the group consisting of single-walled carbon nanotubes, double-walled carbon nanotubes, multi-walled carbon nanotubes, carbon black, acetylene black, graphite, graphene, metal, metal oxide, doped metal oxides metal carbide and polyanaline.

4. The fuser member of claim 3 wherein the fuser member has a surface resistivity of less that about $10^9$ ohms/square.

5. A fuser member comprising:
   a substrate;
   a silicone layer disposed on the substrate;
   a dual-primer layer comprising a first primer layer disposed on the silicone layer comprising a crosslinked product of amino-silane and fluoroelastomer, and a second primer layer disposed on the first primer layer comprising a conductive filler and a fluoropolymer wherein the dual-primer layer has a thickness of from about 1 μm to about 10 μm, wherein the primer layer has a surface resistivity of less than $10^5$ ohms/square; and
   an outer layer disposed on the second primer layer wherein the outer layer comprises a fluoroplastic.

6. The fuser member of claim 5 wherein the conductive filler is selected from the group consisting of carbon nanotubes, carbon black, acetylene black, graphite, graphene, metal, metal oxide, doped metal oxides metal carbide and polyanaline.

* * * * *